(No Model.)  2 Sheets—Sheet 1.
M. C. RICHARDS.
DOOR HANGER.
No. 438,587. Patented Oct. 14, 1890.
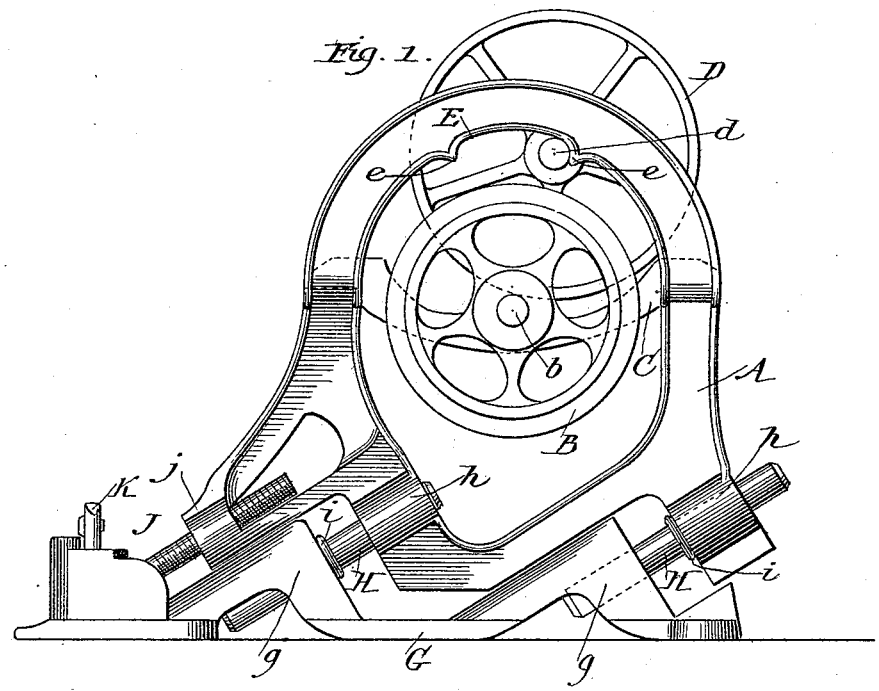
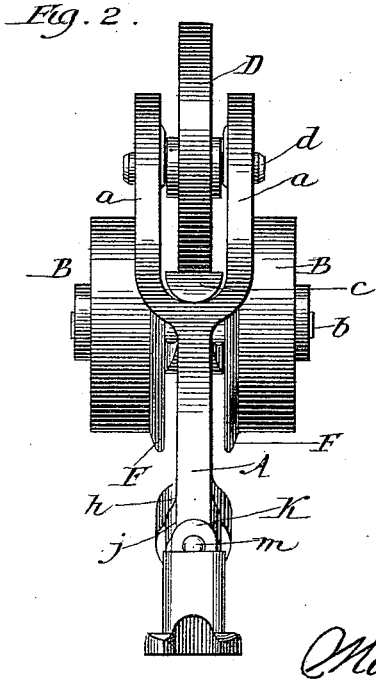
Witnesses:
Ella C. Nemett
John L. Jackson
Inventor:
Marcus C. Richards
by Bond, Adams & Jones
Attys.

(No Model.) 2 Sheets—Sheet 2.
M. C. RICHARDS.
DOOR HANGER.
No. 438,587. Patented Oct. 14, 1890.
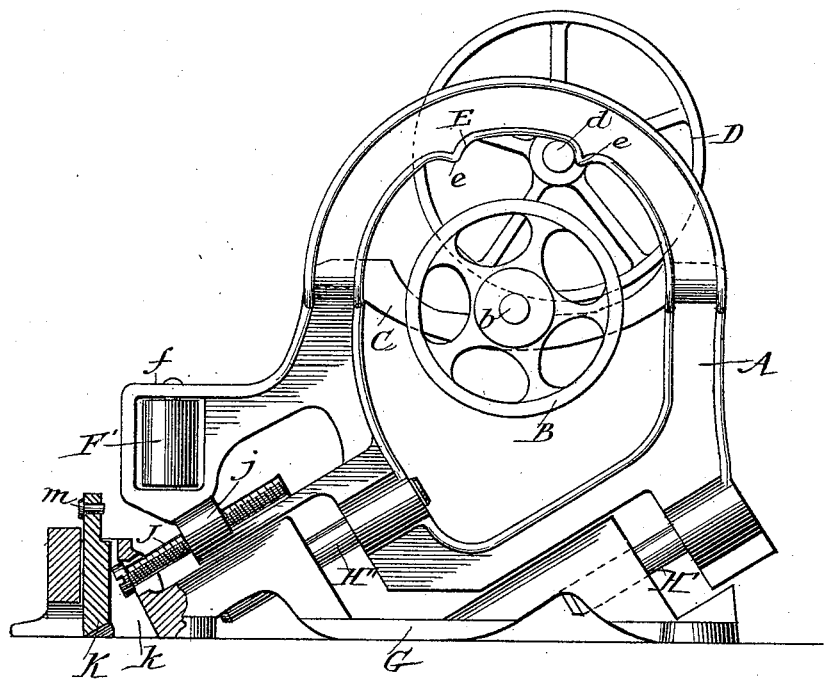
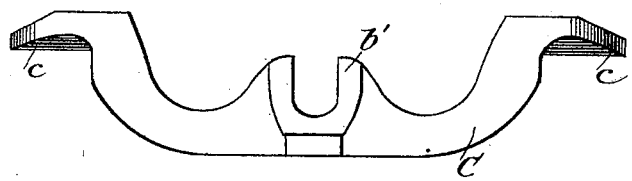
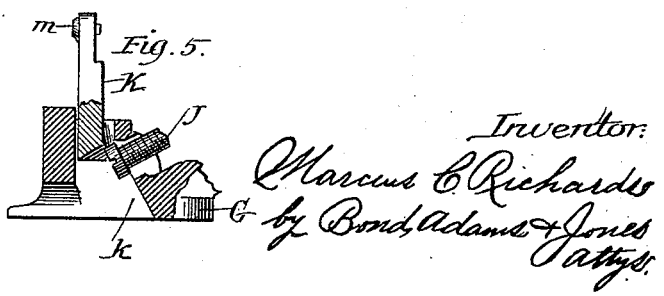
Witnesses:
Ella Nemett
John L. Jackson.
Inventor:
Marcus C. Richards
by Bond, Adams & Jones
attys.
THE NORRIS PETERS CO., PHOTO-LITHO., WASHINGTON, D. C.

United States Patent Office.

MARCIUS C. RICHARDS, OF AURORA, ILLINOIS.

DOOR-HANGER.

SPECIFICATION forming part of Letters Patent No. 438,587, dated October 14, 1890.

Application filed July 18, 1890. Serial No. 359,231. (No model.)

*To all whom it may concern:*

Be it known that I, MARCIUS C. RICHARDS, residing at Aurora, Kane county, Illinois, and a citizen of the United States, have invented certain new and useful Improvements in Door-Hangers, of which the following is a specification, reference being had to the accompanying drawings, in which—

Figure 1 is a side elevation. Fig. 2 is an end elevation. Fig. 3 is a side elevation showing various mechanical modifications. Fig. 4 is a detail showing the holder for the axle of the track-wheels, and Fig. 5 is a detail showing the stop raised in position for adjusting the hanger.

My present invention relates to improvements in door-hangers of the class shown in Letters Patent No. 241,882, granted to Henry E. Richards, May 24, 1881.

The objects of my present invention are to provide an anti-friction bearing for the axle of the track-wheels; to provide an improved holder for the axle of the track-wheel, which will permit the wheels to adjust themselves to the track; to provide an improved device for securing the yoke and plate at any desired adjusted position on the slides, and to provide improved slides for the plate and yoke. I accomplish these several objects as illustrated in the drawings and as hereinafter described. That which I claim as new will be pointed out in the claims.

Similar letters refer to similar parts throughout the drawings.

The yoke A may be made in any suitable form adapted to hold the carrying-wheels B and perform the offices hereinafter mentioned. As best shown in Fig. 2, the yoke A is bifurcated to form two parts $a\ a$.

The track-wheels B B are adapted to run upon the usual track and are both secured upon an axle $b$. They are held in proper position by a holder C. (Shown in Fig. 4 and hereinafter specifically described.)

An anti-friction wheel D is placed between the parts $a\ a$ of the yoke A in the construction shown in Fig. 2. The tread of the wheel D engages with the axle $b$ of the track-wheels B, as indicated by dotted lines in Fig. 1. The yoke A is suspended from the axle $d$ of the anti-friction wheel D. The yoke A is provided with a curved bearing-surface E for the axle $d$. This bearing-surface is the segment of a circle whose center is the center of the axle $b$. The ends $e$ of the bearing-surface E form stops for the axle $d$. By this construction the weight upon the yoke A rests upon the axle $d$ of the wheel D, and the wheel D engages with and is supported by the axle $b$ of the track-wheels B. When the door is slid from closed to open position, or vice versa, the wheels B travel on the track and the anti-friction wheel D is rotated by its engagement with the axle $b$, and its axle $d$ travels in contact with the curved bearing E of the yoke, thereby avoiding any friction, and the bearing E being curved the axle $d$ always remains in the same plane in regard to the yoke A, so that the yoke is not raised or lowered by the travel of the anti-friction wheel D.

As shown in Figs. 1 and 2, the wheels B are provided with flanges F, which guide the wheels B on the track, as usual. The hanger may be guided by means of a roller F', supported in a bearing $f$, as shown in Fig. 3. The construction shown in Fig. 1, however, is the preferable construction.

The holder C for the axle $b$ of the wheels B has a bearing $b'$ for the axle $b$, and its ends $c$ are rounded on their lower faces, as shown in Fig. 2. These ends $c$ rest in the forks of the yoke A, as best shown in Fig. 2. The track-wheels B can therefore rise or fall with any unevenness in the track, the holder C oscillating in the forks of the yoke A. The bearing $b'$ prevents the wheels from changing their position either forward or backward.

The attaching-plate G is to be secured upon the upper edge of the door near the side edge, as usual. Inclined slides H are inserted in guides $h$ in the yoke A and in guides $g$ in the plate G in the construction shown in Fig. 1, each slide H being provided with a collar $i$, which prevents the slide from falling out of position. The construction shown in Fig. 1 I consider preferable, as the yoke A can slide upon the slides H, as shown at the left in Fig. 1, or the plate G can slide upon the slide H, as shown at the right in Fig. 1. If desired, however, a slide H' may be used, which is secured in the yoke, as shown at the right in Fig. 3, or a slide H'' may be secured in the plate G, as shown at the left in Fig. 2. The two constructions shown in Fig. 3 are, in fact, identical in operation.

The plate G can be raised or lowered for the purpose of raising or lowering or leveling the door which is attached thereto by means of an adjusting-screw J, which is placed at the same incline as the slides H and affords a means of supporting the door at a proper height and for leveling the same.

The yoke A is provided with a screw-threaded boss j, which receives the adjusting-screw J. The head of the screw J engages with the inner face of a recess k in the plate G, as best shown in Fig. 3. By turning the screw J by means of a screw-driver the plate G can be raised or lowered in relation to the yoke A.

Devices of various kinds have been heretofore used in which the attaching-plate is adjusted upon the yoke by means of an adjusting-screw and slides of various forms. In all such devices wherein the adjusting-screw is not secured in both the plate and yoke the plate and the door attached can be lifted, which is objectionable for many reasons. In order to avoid this objection, I provide a movable stop K, which is located in a recess k in the plate G. When the stop K is in the position shown in Fig. 3, it will be in contact with the head of the set-screw J, which will prevent the plate G from being lifted on the slides. The stop is lifted into the position shown in Fig. 5 when it is desired to adjust the screw J so that a screw-driver can be used. The stop K in the construction shown is a sliding stop, and is larger at the bottom than at the top, so that it cannot be pushed out through the top of the recess k. After it is put in position it is held from falling out at the bottom of the recess k by a pin m. The essential feature is that a movable stop be placed in the recess to engage with the head of the screw to prevent the plate from being lifted upward.

The construction and arrangement of the track-wheels B and anti-friction wheels D may be modified in various parts. The essential feature, however, is that an anti-friction wheel or wheels engage with the axle of the track wheel or wheels, and that the axle of the anti-friction wheel or wheels engage with a curved bearing or bearings, such as E, upon the yoke A.

What I claim as new, and desire to secure by Letters Patent, is—

1. In a door-hanger, the combination, with a yoke having a curved bearing E, and an axle b, of an anti-friction wheel D, whose tread engages with the axle b, and whose axle d engages with the curved bearing E, substantially as and for the purpose specified.

2. In a door-hanger, the combination, with track-wheels B, having an axle b, of a yoke A and an oscillating holder C for the axle b, substantially as and for the purpose specified.

3. In a door-hanger, the combination, with a yoke A, having a curved bearing E, and track-wheels B, having an axle b, of an oscillating holder C for the axle b, and an anti-friction wheel D, engaging with the axle b and having an axle d engaging with the bearing E, substantially as and for the purpose specified.

4. In a door-hanger, the combination, with a yoke A, plate G, and an inclined slide, of an adjusting-screw J and a movable stop arranged to engage with the head of such screw, substantially as and for the purpose specified.

5. In a door-hanger, the combination, with a yoke A, plate G, and an adjusting-screw J, of loose reversible inclined slides H, substantially as and for the purpose specified.

MARCIUS C. RICHARDS.

Witnesses:
L. H. DAY,
GEORGE H. HALE.